(12) United States Patent
Dhamija et al.

(10) Patent No.: US 12,107,756 B2
(45) Date of Patent: Oct. 1, 2024

(54) TRANSPORT SLICE IDENTIFIER ENCODING IN DATA PLANE FOR AI/ML-BASED CLASSIFICATION MODEL

(71) Applicant: RAKUTEN MOBILE, INC., Tokyo (JP)

(72) Inventors: Amit Dhamija, Bengaluru (IN); Praveen Kumar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/793,107

(22) PCT Filed: Jun. 16, 2022

(86) PCT No.: PCT/US2022/033717
§ 371 (c)(1),
(2) Date: Jul. 15, 2022

(87) PCT Pub. No.: WO2023/244228
PCT Pub. Date: Dec. 21, 2023

(65) Prior Publication Data
US 2024/0179088 A1 May 30, 2024

(51) Int. Cl.
*H04L 45/02* (2022.01)
*H04L 41/0803* (2022.01)
(Continued)

(52) U.S. Cl.
CPC .......... *H04L 45/08* (2013.01); *H04L 41/0803* (2013.01); *H04L 41/147* (2013.01);
(Continued)

(58) Field of Classification Search
CPC ..... H04L 45/08; H04L 41/08; H04L 41/0803; H04L 41/0895; H04L 45/34;
(Continued)

(56) References Cited

U.S. PATENT DOCUMENTS

2020/0053643 A1* 2/2020 Lee ................... H04W 48/18
2020/0092195 A1* 3/2020 Ding ................. H04L 45/22
(Continued)

FOREIGN PATENT DOCUMENTS

WO 2022/048744 A1 3/2022
WO WO-2022166348 A1 * 8/2022

OTHER PUBLICATIONS

International Search Report dated Oct. 27, 2022 issued by the International Search Authority in Application No. PCT/US 22/33717.
(Continued)

*Primary Examiner* — Mohamed A Kamara
(74) *Attorney, Agent, or Firm* — Sughrue Mion, PLLC

(57) ABSTRACT

Provided are methods and apparatuses for identifying a transport network slice in a data plane of a transport network by a network device. In an embodiment, the method includes generating a transport slice identifier corresponding to the transport network slice. The method further includes transmitting a configuration message requesting rendering of a transport network path assigned to the transport network slice. The method further includes obtaining a prediction, using an artificial intelligence/machine learning (AI/ML) model, of at least one required configuration of the transport network slice, based at least on historical information related to the transport network slice. The method further includes applying the at least one required configuration to the transport network slice.

18 Claims, 7 Drawing Sheets

(51) Int. Cl.
    *H04L 41/147* (2022.01)
    *H04L 41/16* (2022.01)
    *H04L 41/40* (2022.01)
    *H04L 45/00* (2022.01)
    *H04L 45/58* (2022.01)
    *H04L 45/741* (2022.01)

(52) U.S. Cl.
    CPC .............. *H04L 41/16* (2013.01); *H04L 41/40* (2022.05); *H04L 45/58* (2013.01); *H04L 45/34* (2013.01); *H04L 45/741* (2013.01)

(58) Field of Classification Search
    CPC ... H04L 45/302; H04L 45/741; H04L 41/147; H04L 41/149; H04L 41/16; H04L 41/40
    See application file for complete search history.

(56) References Cited

U.S. PATENT DOCUMENTS

| | | |
|---|---|---|
| 2020/0120022 A1 | 4/2020 | Stammers et al. |
| 2021/0204162 A1 | 7/2021 | Chunduri et al. |
| 2022/0132413 A1* | 4/2022 | Hu .................. H04W 48/18 |
| 2022/0174009 A1* | 6/2022 | Qiu .................. H04L 45/74 |
| 2023/0180169 A1* | 6/2023 | Venkataraman .... H04W 60/005 455/435.1 |

OTHER PUBLICATIONS

Written Opinion dated Oct. 27, 2022 issued by the International Search Authority in Application No. PCT/US 22/33717.

* cited by examiner

TRANSPORT SLICE IDENTIFIER ENCODING IN DATA PLANE FOR AI/ML-BASED CLASSIFICATION MODEL

TECHNICAL FIELD

The present disclosure relates generally to communication systems, and more particularly to methods and apparatuses for transport slice identifier encoding in a data plane for artificial intelligence/machine learning (AI/ML)-based classification model.

BACKGROUND

Related communication systems, such as wireless communication systems (e.g., 4G, Long Term Evolution (LTE), 5G) may be deployed to provide various telecommunication services such as telephony, video, data, messaging, and broadcasts. In order to meet ever increasing demands for wireless data traffic, network technologies may seek to implement an end-to-end (E2E) system in which all targets are integrated over a network providing access in a wired manner, a wireless manner, or other various schemes. To that end, standardization organizations (e.g., International Telecommunication Union (ITU), Next Generation Mobile Networks (NGMN) Alliance, Third Generation Partnership Project (3GPP), Internet Engineering Task Force (IETF)) may define and/or design system and/or network architectures to implement network technologies that may feature high performance, low latency, and high availability.

One such network technology may involve the adoption of network slicing for radio access networks (RANs) and core networks (CNs) that are interconnected to each other via transport networks (TNs). Under network slicing, network resources and network functions may be bundled into network slices depending on individual services, service level agreements (SLAs), and/or network path routing to be provided by each network slice. That is, a network slice over a communication network may provide customized network services by combining control plane (CP) and user plane (UP) network functions for network services necessary for a particular service over a CN and a RAN.

Related mechanisms for deploying and implementing network slicing functionality across network domains may rely on the use of different network slice subnet management function (NSSMF) devices for each domain. For example, each of the RAN, CN, and TN domains may each independently implement separate NSSMF devices (e.g., RN-NSSMF, CN-NSSMF, and TN-NSSMF, respectively). As such, each domain (e.g., RAN, CN, and TN) may operate independently without awareness of the other domains. In addition, multiple network slices in the RAN and CN domains may be mapped to a single transport network slice in the TN domain. As a result, related transport network configuration devices may be unable to allocate appropriate resources for the aggregate of the RAN and CN network slices mapped to a particular transport network slice in the TN domain.

Thus, there exists a need for further improvements in 5G network slicing technology. Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for identifying a transport network slice in a data plane of a transport network are disclosed by the present disclosure.

According to an aspect of the disclosure, a method of identifying a transport network slice in a data plane of a transport network by a network device includes generating a transport slice identifier corresponding to the transport network slice. The method further includes transmitting, to a transport network node of the transport network, a configuration message requesting rendering of a transport network path assigned to the transport network slice. The method further includes obtaining a prediction, using an artificial intelligence/machine learning (AI/ML) model, of at least one required configuration of the transport network slice, based at least on historical information related to the transport network slice. The method further includes applying the at least one required configuration to the transport network slice.

According to some embodiments of the disclosure, the method further includes causing an ingress node of the one or more transport network nodes to encapsulate incoming packets corresponding to the transport network slice with an Internet Protocol version 6 (IPv6) header comprising the transport slice identifier. The method further includes causing an egress node of the one or more transport network nodes to de-encapsulate the IPv6 header comprising the transport slice identifier from outgoing packets corresponding to the transport network slice.

According to some embodiments of the disclosure, the method further includes causing the ingress node to encapsulate the incoming packets with the IPv6 header comprising the transport slice identifier in a source address field of the IPv6 header.

According to some embodiments of the disclosure, the method further includes causing the ingress node to encapsulate the incoming packets corresponding to the transport network slice with a segment routing (SRH) header. The method further includes causing the egress node to de-encapsulate the SRH header from the outgoing packets corresponding to the transport network slice.

According to some embodiments of the disclosure, the incoming packets corresponding to the transport network slice are addressed to traverse the transport network to reach respective destinations outside of the transport network.

According to some embodiments of the disclosure, the method further includes transmitting, to the transport network node of the transport network, the configuration message using a path computation element communication protocol (PCEP).

According to some embodiments of the disclosure, the transport network slice is mapped to a plurality of radio access network (RAN) slices and to a plurality of core network (CN) slices.

According to some embodiments of the disclosure, the method further includes providing, to the AI/ML model, the transport slice identifier. The method further includes publishing, to the AI/ML model, a transport slice mapping database indicating one or more first mapping relationships between the transport slice identifier and respective identifiers of the plurality of RAN slices and the plurality of CN slices mapped to the transport network slice. The method further includes publishing, to the AI/ML model, a transport slice path mapping database indicating one or more second mapping relationships between transport slice identifiers and transport network paths of the transport network. The method further includes providing, to the AI/ML model, historical bandwidth usage information of the plurality of RAN slices and the plurality of CN slices mapped to the transport network slice. The method further include providing, to the AI/ML model, traffic matrix information related to slicing flow bandwidth and latency used in the transport network. The prediction of the at least one required configuration being based on the transport slice identifier, the transport slice mapping database, the transport slice path mapping database, the historical bandwidth usage information, and the traffic matrix information.

According to some embodiments of the disclosure, the at least one required configuration of the transport network slice is a maximum aggregated bandwidth of the transport network slice.

According to another aspect of the disclosure, an apparatus, for identifying a transport network slice in a data plane of a transport network, includes a memory storage storing computer-executable instructions and a processor communicatively coupled to the memory storage. The processor is configured to execute the computer-executable instructions and cause the apparatus to generate a transport slice identifier corresponding to the transport network slice. The computer-executable instructions further cause the apparatus to transmit, to a transport network node of the transport network, a configuration message requesting rendering of a transport network path assigned to the transport network slice. The computer-executable instructions further cause the apparatus to obtain a prediction, using an AI/ML model, of at least one required configuration of the transport network slice, based at least on historical information related to the transport network slice. The computer-executable instructions further cause the apparatus to apply the at least one required configuration to the transport network slice.

According to another aspect of the disclosure, a non-transitory computer-readable storage medium has recorded thereon a program for identifying a transport network slice in a data plane of a transport network by an apparatus. The program includes operations to generate a transport slice identifier corresponding to the transport network slice. The program includes further operations to transmit, to a transport network node of the transport network, a configuration message requesting rendering of a transport network path assigned to the transport network slice. The program includes further operations to obtain a prediction, using an AI/ML model, of at least one required configuration of the transport network slice, based at least on historical information related to the transport network slice. The program includes further operations to apply the at least one required configuration to the transport network slice.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
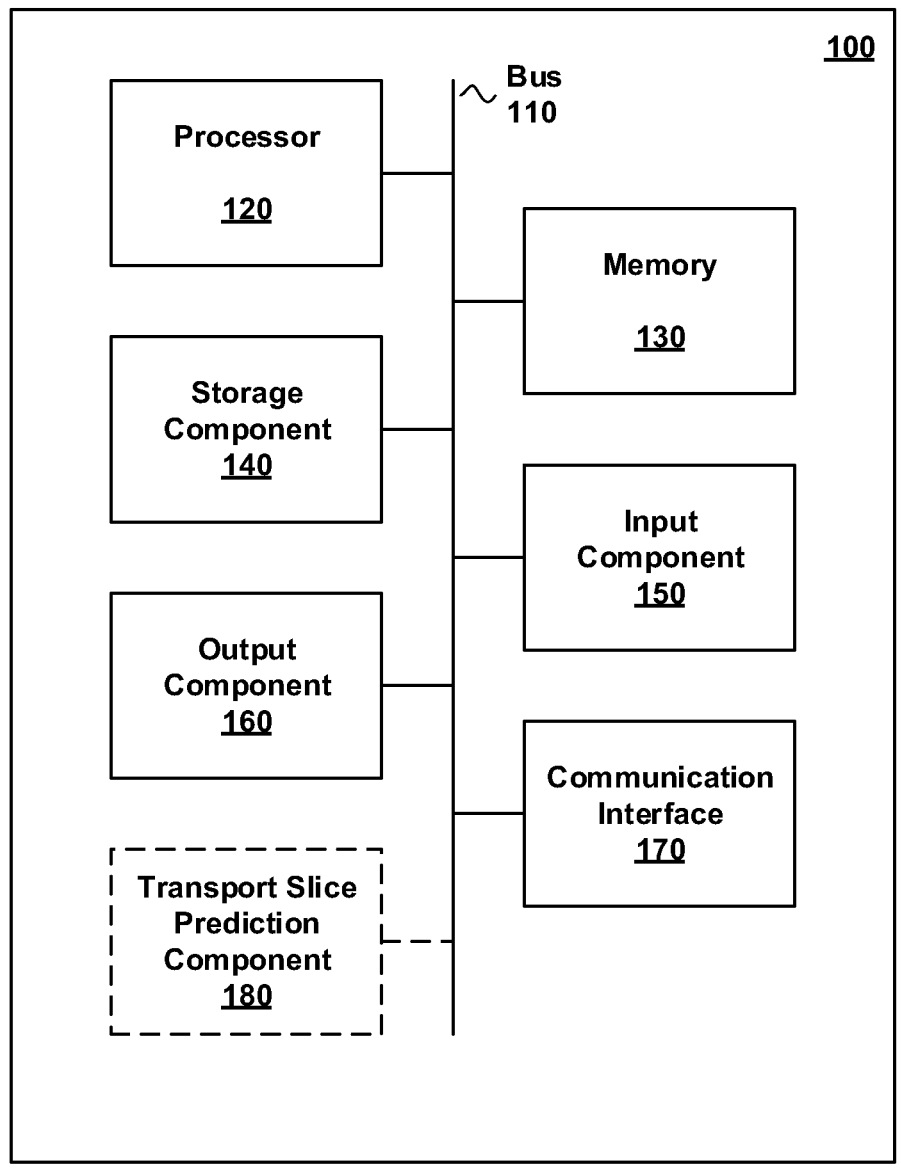
FIG. 1 is a diagram of an example device for identifying a transport network slice in a data plane of a transport network, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Network slicing may allow for network resources and network functions to be bundled into network slices depending on individual services, service level agreements (SLAs), and/or network path routing to be provided by each network slice. That is, a network slice over a communication network may provide customized network services by combining control plane (CP) and user plane (UP) network functions for network services necessary for a particular service over a core network (CN) and a radio access network (RAN) that may be interconnected to each other via a transport network (TN).

However, related mechanisms for deploying and implementing network slicing functionality across network domains may rely on the use of different network slice subnet management function (NSSMF) devices for each domain (e.g., RN-NSSMF, CN-NSSMF, and TN-NSSMF) that may operate independently without awareness of the other domains. In addition, multiple network slices in the RAN and CN domains may be mapped to a single transport network slice in the TN domain. As a result, related transport network configuration devices may be unable to allocate appropriate resources for the aggregate of the RAN and CN network slices mapped to a particular transport network slice in the TN domain.

Aspects presented herein provide methods and apparatuses for identifying a transport network slice in a data plane of a transport network such that performance of the aggregated transport network slice may be monitored. The performance information of the aggregated transport network slice may be provided to an artificial intelligence/machine learning (AI/ML) model that may be configured to predict configuration changes to the aggregated transport network slice that may maintain and/or improve performance of the aggregated transport network slice. Further, aspects presented herein may allow for performing slice isolation, traffic prioritization, traffic accounting, and/or slice bandwidth prediction on the transport network slice, using a shared slicing aggregate (e.g., n:1) model.

FIG. 1 is diagram of an example device for identifying a transport network slice in a data plane of a transport network. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a transport slice prediction component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any related art processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the transport slice prediction component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

In some embodiments, the device 100 may comprise the transport slice prediction component 180 configured to identify a transport network slice in a data plane of a transport network. The transport slice prediction component 180 may be configured to generate a transport slice identifier corresponding to the transport network slice, transmit a configuration message requesting rendering of a transport network path, monitor a performance metric of the transport network slice, predicting, using an artificial intelligence/machine learning (AI/ML) model, a required configuration of the transport network slice, and apply the required configuration to the transport network slice.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
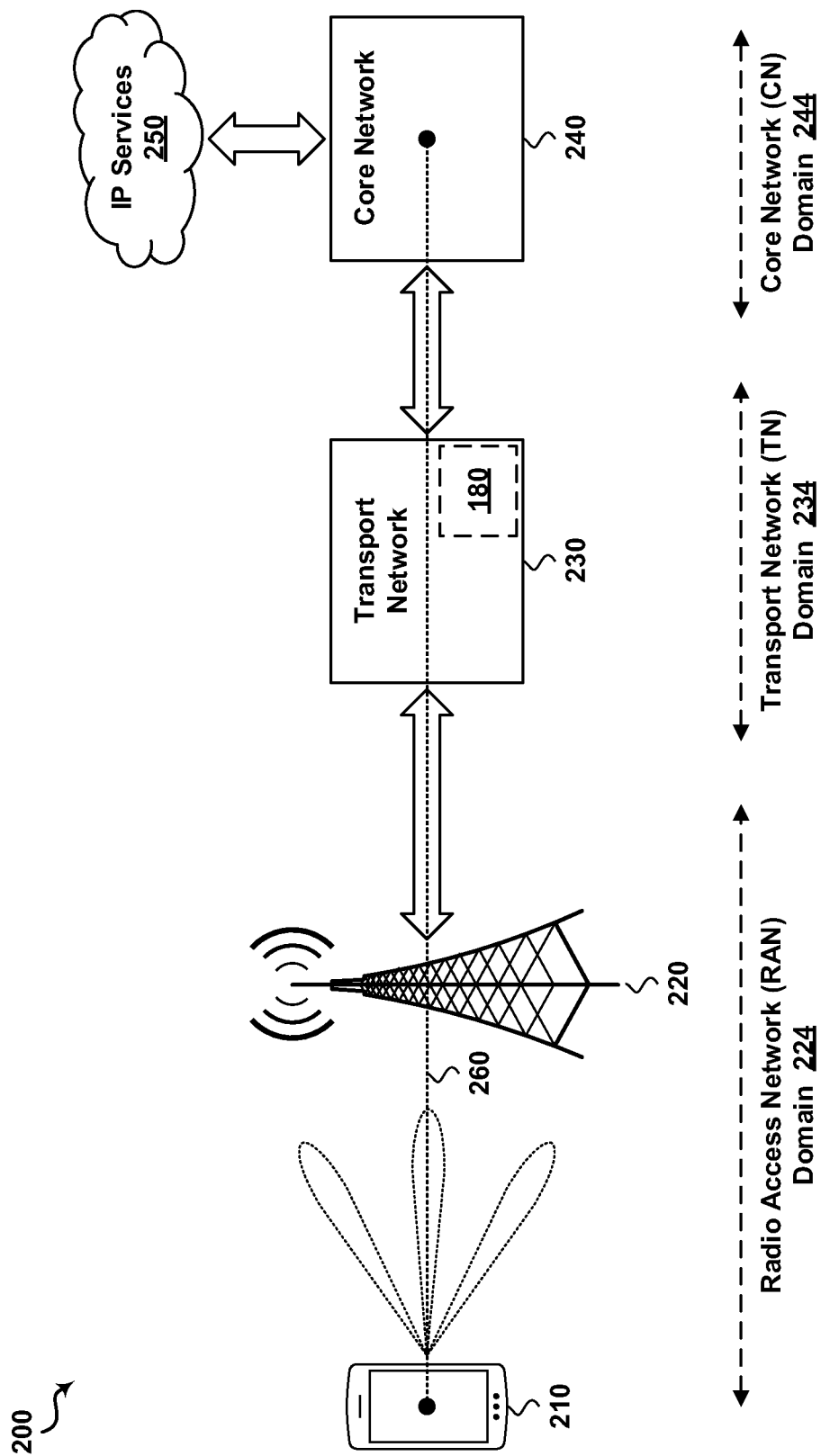
FIG. 2 is a schematic diagram of an example wireless communications system, in accordance with various embodiments of the present disclosure.

FIG. 2 is a diagram illustrating an example of a wireless communications system, according with various embodiments of the present disclosure. The wireless communications system 200 (which may also be referred to as a wireless wide area network (WWAN)) may include one or more user equipment (UE) 210, one or more base stations 220, at least one transport network 230, and at least one core network 240.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macro-cells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or another type of base station.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless. Alternatively or additionally, the transport network 230 may comprise the transport slice prediction component 180 of FIG. 1.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Continuing to refer to FIG. 2, an end-to-end network slice 260 may provide a required connectivity between the UE 210 and the core network 240 with a specified performance commitment. The end-to-end network slice 260 may refer to a logical network topology connecting a number of endpoints (e.g., UE 210, core network 240) using a set of shared or dedicated network resources (e.g., base station 220, transport network 230) that are used to satisfy a specific performance commitment. The performance commitments that are to be satisfied by the end-to-end network slice 260 may be referred to as service level agreements (SLAs), service level objectives (SLOs), service level expectations (SLEs), and/or service level indicators (SLIs). Examples of these performance commitments may include, but are not limited to, a guaranteed minimum bandwidth (e.g., bandwidth between two end points in a particular direction), a guaranteed maximum latency (e.g., network latency when transmitting between two endpoints), a maximum permissible delay variation (PDV) (e.g., a maximum difference in a one-way delay between sequentially transmitted packets in a flow), a maximum permissible packet loss rate (e.g., a ratio of packets dropped to packets transmitted), and a minimum availability ratio (e.g., a ratio of uptime to the sum of uptime and downtime).

The UE 210 may access multiple network slices 260 over one or more base stations 220 (not shown). In some embodiments, each network slice 260 may serve a particular service type with a specified performance commitment.

In some embodiments, each network slice 260 may be identified by a global identifier, such as a single network slice selection assistance information (S-NSSAI). That is, the S-NSSAI may be used by the RAN domain 224, the TN domain 234, and the CN domain 244 to identify the network slice 260.

The S-NSSAI may comprise information regarding a slice and/or service type (SST), which may indicate an expected behavior of the particular network slice in terms of features and/or services. The S-NSSAI may further comprise a slice differentiator (SD), which may allow for further differentiation for selecting a network slice instance from one or more network slice instances that may comply with the indicated SST. Alternatively or additionally, the SST and/or the SD comprised by the S-NSSAI may use standard values and/or may use values specific to a particular network provider (e.g., public land mobile network (PLMN)).

Figure 3:
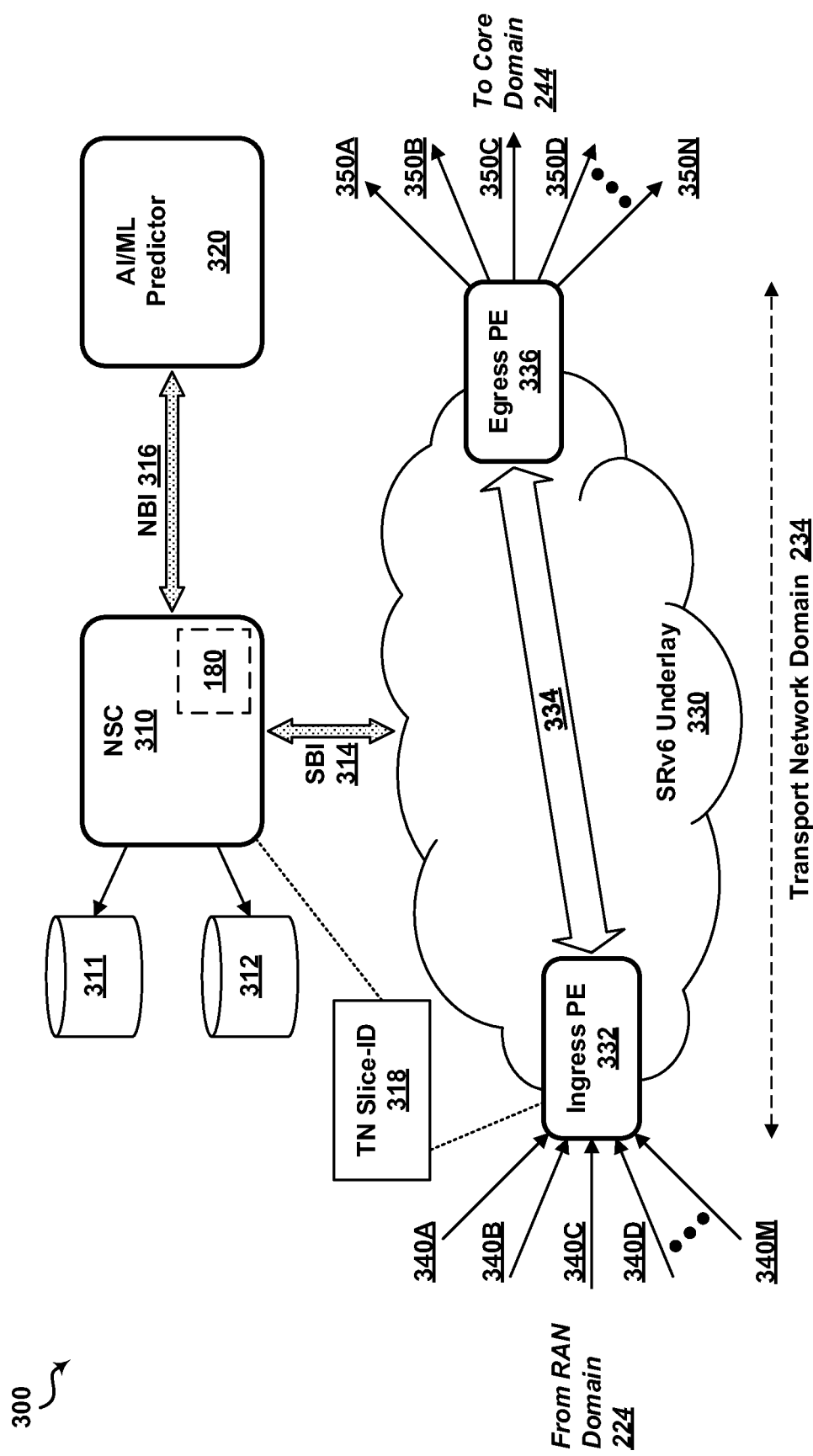
FIG. 3 is a schematic diagram of an example transport network for identifying a transport network slice in a data plane of the transport network, in accordance with various embodiments of the present disclosure.

FIG. 3 is a schematic diagram of an example transport network for identifying a transport network slice in a data plane of the transport network, in accordance with various embodiments of the present disclosure. The transport network 300 described in FIG. 3 may be implemented by and/or be included with the wireless communications system 200 described above with reference to FIG. 2, and may include additional features not mentioned above. In some embodiments, at least a portion of the transport network 300 illustrated in FIG. 3 may be performed by the device 100 of FIG. 1, including the transport slice prediction component 180.

As shown in FIG. 3, the transport network 300 may comprise a network slice controller (NSC) 310, including the transport slice prediction component 180, that is configured to control a segment routing version 6 (SRv6) underlay 330. The SRv6 underlay 330 may provide configurable connectivity via one or more transport network nodes (e.g., ingress provider edge (PE) 332, egress PE 336) that may render (e.g., implement a transport network path 334. Although, for the sake of clarity, the SRv6 underlay 330 is depicted with two transport network nodes rendering a single transport network path, the SRv6 underlay 330 may comprise any quantity of transport network nodes (e.g., integer greater than two) capable of rendering multiple transport network paths that traverse the transport network domain 234. For at least similar reasons, the transport network path 334 depicted in FIG. 3 is shown as a direct connection between the ingress PE 332 and the egress PE 336. However, the SRv6 underlay 330 may be configured to render transport network paths using one or more intermediary transport network nodes (e.g., transit nodes, not shown) between an ingress PE device and an egress PE device. The disclosure is not limited in this regard.

The NSC 310 may be configured to provide a transport network-network slice subnet management function (TN-NSSMF) to the transport network 300. In some embodiments, the NSC 310 may also be referred to as a TN orchestrator. The NSC 310 may receive a slice creation request to create the TN domain portion of the network slice 260. For example, the slice creation request may be sent by a network slice management function (NSMF, not shown) to the NSC 310 and may comprise a S-NSSAI identifying the network slice 260 and/or the service profile determined for the TN domain 234.

In some embodiments, the NSC 310 may receive the slice creation request via a representational state transfer application programming interface (REST-API). Alternatively or additionally, the NSC 310 may receive a message comprising the slice creation request. The present disclosure is not limited in this regard.

The NSC 310 may generate, based on the slice creation request, a transport slice identifier (e.g., TN Slice-ID 318) corresponding to the network slice 260 based at least on the S-NSSAI indicated by the slice creation request received from the NSMF. For example, the NSC 310 may generate the transport slice identifier using a source address, a destination address, and network path constraints indicated by the slice creation request, based on a determination of whether the S-NSSAI indicated by the slice creation request is found in a transport slice mapping database 311 comprising mappings between S-NSSAI values and TN Slice-ID 318 values. In another example, the NSC 310 may generate the TN Slice-ID 318 using the source address and the destination address indicated by the slice creation request. In some embodiments, the NSC 310 may obtain the TN Slice-ID 318 from one or more transport network nodes (e.g., ingress provider edge (PE) 332, egress PE 336) of the SRv6 underlay 330. For example, the NSC 310 may obtain the transport slice identifier information via a southbound interface (SBI) 314.

The transport slice mapping database 311 may comprise a single database or may comprise different logical, virtual, or physical databases, depending on a design of the NSC 310 and/or the transport network 300. Alternatively or additionally, the transport slice mapping database 311 may be implemented by one or more data processing devices, such as any type of known computer, server, or data processing device. For example, the transport slice mapping database 311 may comprise a processor, a PC, a PCB comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Those of skill in the art will appreciate that the functionality of the transport slice mapping database 311 as described herein may be spread across multiple data processing devices, for example, to distribute processing load across multiple computers, to segregate transactions based on geographic location, user access level, quality of service (QoS), etc. The present disclosure is not limited in this regard.

In response to receiving the slice creation request, the NSC 310 may compute and/or allocate a transport network path 334 for the network slice 260. For example, the NSC 310 may select the transport network path 334 based at least on a source address indicated by the slice creation request, a destination address indicated by the slice creation request, and/or network path constraints (e.g., service profile, performance commitments) indicated by the slice creation request. Alternatively or additionally, the NSC 310 may configure one or more transport network nodes of the SRv6 underlay 330 to provide the transport network path 334 between the RAN domain 224 and the core network 240 according to the performance commitments specified for the network slice 260. For example, the source address may correspond to the ingress PE 332 that may be connected to the RAN domain 224, and the destination address may correspond to the egress PE 336 that may be connected to the CN domain 244.

In some embodiments, the NSC 310 may compute the transport network path 334 according to the source address, the destination address, and the network path constraints (e.g., SLA) indicated by the slice creation request. For example, the network path constraints may indicate desired constraints (e.g., low latency, high bandwidth, high reliability) that are to be met by the transport network path 334. The NSC 310 may be configured to assign (associate) the transport network path 334 to the transport slice identifier (e.g., TN Slice-ID 318) and the S-NSSAI indicated by the slice creation request. In some embodiments, the NSC 310 may store the mapping relationship between the TN Slice-ID 318 and the transport network path 334 in a transport slice path mapping database 312, as described in co-pending and commonly assigned International Patent Application No. PCT/US2022/028951, titled "TRANSPORT SLICE IDENTIFIER FOR END-TO-END 5G NETWORK SLICING MAPPING", and filed on May 12, 2022, the disclosure of which is hereby incorporated by reference.

The transport slice path mapping database 312 may comprise a single database or may comprise different logical, virtual, or physical databases, depending on a design of the NSC 310 and/or the transport network 300. Alternatively or additionally, the transport slice path mapping database 312 may be implemented by one or more data processing devices, such as any type of known computer, server, or data processing device. For example, the transport slice path mapping database 312 may comprise a processor, a PC, a PCB comprising a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device. Those of skill in the art will appreciate that the functionality of the transport slice path mapping database 312 as described herein may be spread across multiple data processing devices, for example, to distribute processing load across multiple computers, to segregate transactions based on geographic location, user access level, QoS, etc. The present disclosure is not limited in this regard.

In some embodiments, the transport network path 334 may be mapped to a plurality of RAN slices (e.g., RAN slices 340A-340M, hereinafter "RAN slices 340", where M is a positive integer greater than 1). That is, the network traffic associated with the RAN slices 340 may be carried across the transport network domain 234 to/from the CN domain 244 by the transport network path 334. Alternatively or additionally, the transport network path 334 may be mapped to a plurality of CN slices (e.g., CN slices 350A-350N, hereinafter "CN slices 350", where N is a positive integer greater than 1). That is, the network traffic associated with the CN slices 350 may be carried across the transport network domain 234 to/from the RAN domain 224 by the transport network path 334.

The NSC 310 may control and/or configure the SRv6 underlay 330 via the SBI 314. In some embodiments, the SBI 314 may comprise a path computation element communication protocol (PCEP) interface to effect control and/or configuration of the SRv6 underlay 330. Alternatively or additionally, the SBI 314 may comprise a border gateway protocol link state (BGP-LS) interface (e.g., BGP-LS interface 614 of FIG. 6) to obtain information (e.g., configuration, status, performance) of the transport network domain 234. For example, the NSC 310 may obtain the transport slice identifier information (e.g., TN Slice-ID 318) using the BGP-LS interface 614.

In some embodiments, the NSC 310 may transmit, to a transport network node (e.g., ingress PE 332), a configuration message requesting the rendering (e.g., implementation, deployment) of the transport network path 334 by the SRv6 underlay 330. That is, the configuration message may cause the SRv6 underlay 330 to render the transport network path 334 such that the transport network slice corresponding to the network slice 260 may be implemented according to the slice creation request. In some embodiments, the NSC 310 may transmit, to the transport network node, the configuration message using the PCEP interface of the SBI 314. Alternatively or additionally, the NSC 310 may transmit the configuration message to another transport network node of the SRv6 underlay 330, such as a transit node (not shown), for example.

The ingress PE 332 may render the transport network path 334 indicated by the configuration message received from the NSC 310. For example, in response to the configuration message, the ingress PE 332 may establish a connection between the RAN domain 224 (e.g., at least one RAN slice 340) and the CN domain 244 (e.g., at least one CN slice 350) via the transport network path 334. It may be understood that the example transport network path 334 illustrated in FIG. 3 is only one example of a near infinite number of possible transport network paths and that the ingress PE 332 may configure the SRv6 underlay 330 with other possible transport network paths without deviating from the scope of the present disclosure.

In some embodiments, the NSC 310 may provide the TN Slice-ID 318 to at least the ingress PE 332. Alternatively or additionally, the NSC 310 may provide the TN Slice-ID 318 to the egress PE 336 and/or to other transport network nodes (e.g., transit nodes, not shown).

In other optional or additional embodiments, the NSC 310 may cause the ingress PE 332 to encapsulate incoming packets corresponding to the transport network slice (e.g., transport network path 334) with an outer Internet Protocol version 6 (IPv6) header comprising the TN Slice-ID 318. In other embodiments, the NSC 310 may also cause the egress PE 336 to encapsulate incoming packets corresponding to the transport network path 334 with the outer IPv6 header comprising the TN Slice-ID 318.

Figure 4:
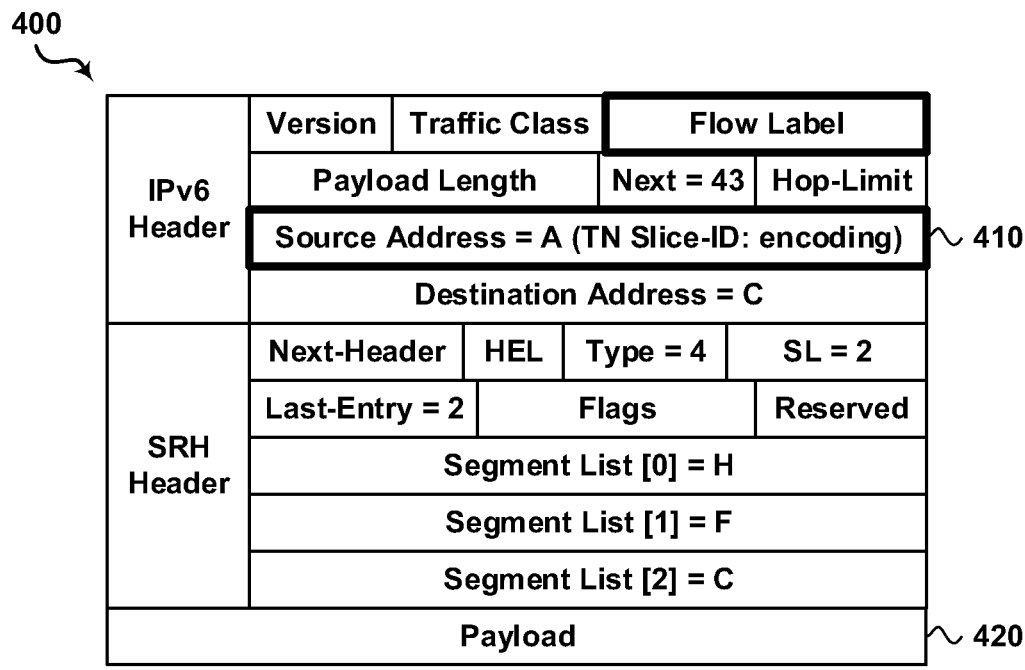
FIG. 4 illustrates an example of an Internet Protocol version 6 (IPv6) header, in accordance with various embodiments of the present disclosure.

As shown in FIG. 4, in some embodiments, the outer IPv6 header encapsulating the incoming packet (e.g., the payload field 420) may comprise the TN Slice-ID 318 in the source address field 410 of the outer IPv6 header of the encapsulated packet 400. That is, the ingress PE 332 may be configured to encapsulate the incoming packets with the outer IPv6 header comprising the transport slice identifier in the source address field 410 of the outer IPv6 header. For example, the source address field 410 may comprise various unused bits as the SRv6 domain works on the principle of locations, which may have a /48 or /64 mask length. As such, at least 8 unused bits of the source address field 410 may be repurposed for carrying the TN Slice-ID 318, which may provide up to 256 distinct slice identification values for the transport domain.

Continuing to refer to FIG. 4, in some embodiments, the ingress PE 332 may be further configured to encapsulate the incoming packets with a segment routing (SRH) header.

Returning to FIG. 3, in other optional or additional embodiments, the NSC 310 may cause the egress PE 336 to de-encapsulate the IPv6 header from outgoing packets corresponding to the transport network slice (e.g., transport network path 334). In other embodiments, the NSC 310 may also cause the ingress PE 332 to de-encapsulate the IPv6 header from the outgoing packets corresponding to the transport network path 334.

In some embodiments, the ingress PE 332 may be configured to classify the incoming packets corresponding to the transport network path 334. For example, the ingress PE 332 may classify the incoming packets according to the network path constraints that are to be met by the transport network path 334 (e.g., low latency, high bandwidth, high reliability).

The encapsulation of the incoming packets corresponding to the transport network path 334 may facilitate the transport network 300 (e.g., NSC 310) to differentiate transport network traffic (e.g., packet transmissions) that corresponds to a particular transport network slice (e.g., slicing traffic) from transport network traffic that does not correspond to a transport network slice (e.g., non-slicing traffic). As such, the transport network 300 may implement one or more network slice-based policies on a per-slice basis, such as, isolation of traffic corresponding to one or more transport network slices, prioritization of transport network slice traffic based on QoS policies, traffic accounting and/or reporting on one or more transport network slices, and slice bandwidth prediction on one or more transport network slices, using a shared slicing aggregate (e.g., n:1) model.

Furthermore, as the IPv6 encapsulation that is performed on packets that traverse the transport network domain 234 is removed (e.g., de-encapsulated) prior to the packets leaving the transport network domain 234, operation of the other domains of the network (e.g., RAN, CN) may not affected.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally or alternatively, a set of (one or more) components shown in FIG. 3 may perform one or more functions described as being performed by another set of components shown in FIGS. 1-3.

It may be understood that the specific order of the operations, the quantity of operations, and arrangement of operations described in reference to FIG. 3 are an illustration of one example approach. Based upon design preferences, it may be understood that the specific order, quantity, and/or arrangement of operations described in reference to FIG. 3 may be rearranged. Further, some operations may be added, combined, or omitted.

Figure 6:
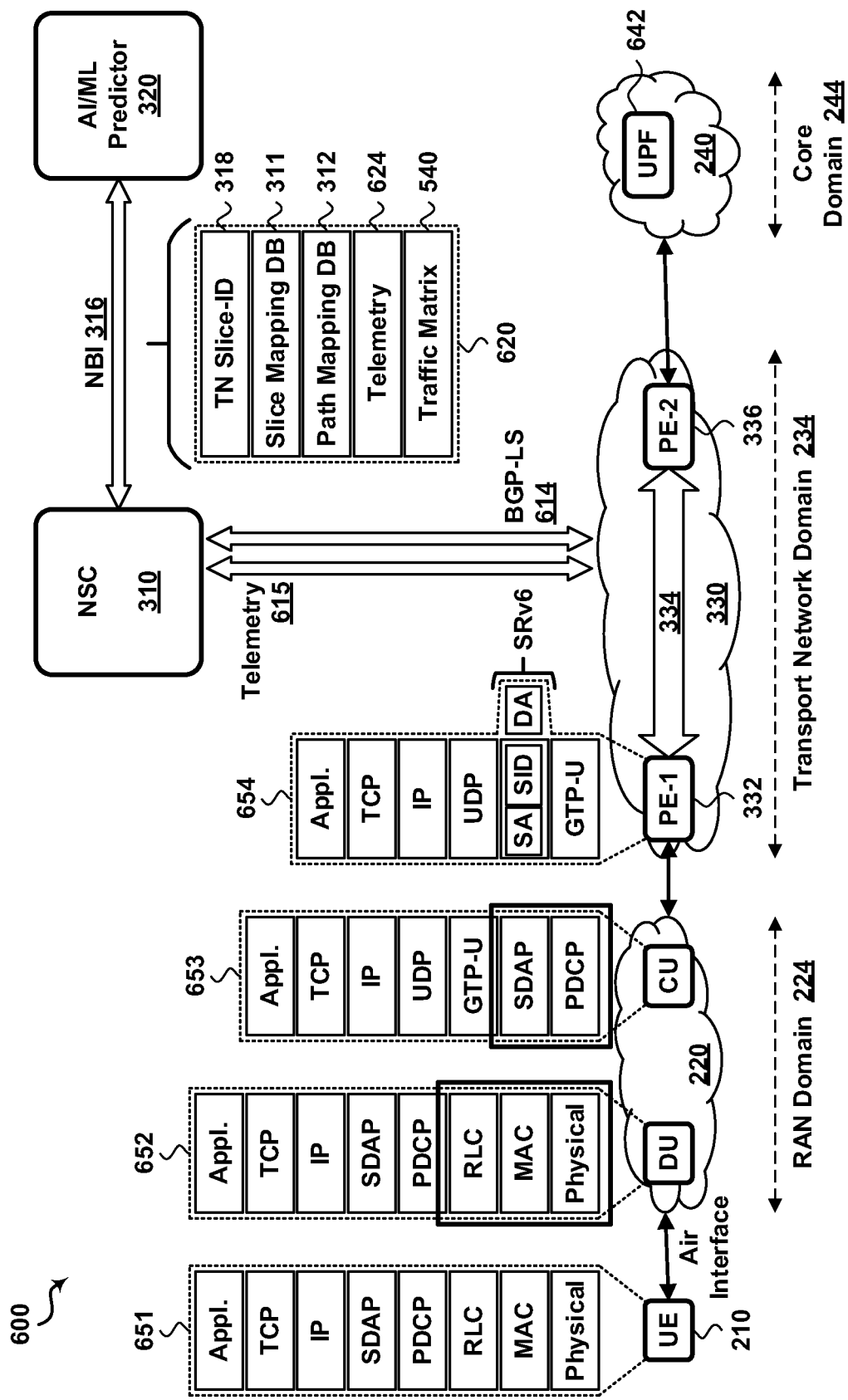
FIG. 6 illustrates is a schematic diagram of an example transport network for estimating aggregated bandwidth, in accordance with various embodiments of the present disclosure.

FIG. 6 is a schematic diagram of an example transport network for estimating aggregated bandwidth, in accordance with various embodiments of the present disclosure. The transport network 600 described in FIG. 6 may be implemented by and/or be included with the wireless communications system 200 described above with reference to FIG. 2, and may include additional features not mentioned above.

The transport network 600 depicted in FIG. 6 may include or may be similar in many respects to the transport network 300 described above in reference to FIG. 3, and may include additional features not mentioned above. In some embodiments, at least a portion of the transport network 600 illustrated in FIG. 6 may be performed by the device 100 of FIG. 1, including the transport slice prediction component 180.

As shown in FIG. 6, the UE 210 may access the at least one core network 240 via a connection to the one or more base stations 220 over a RAN domain 224 and through the at least one transport network 230, using an end-to-end network slice 260 (not shown), as described in further detail in reference to FIG. 2. For example, the UE 210 may communicate via an air interface to the RAN domain 224 (e.g., a distributed unit (DU) of the base station 220) using protocol stack 651. The protocol stack 651 may include an application layer, a transmission control protocol (TCP) layer, an internet protocol (IP) layer, a service data adaptation protocol (SDAP) layer, a packet data convergence protocol (PDCP) layer, a radio link control (RLC) layer, a media access control (MAC) layer, and a physical layer.

The DU of the base station 220 may communicate with a centralized unit (CU) of the RAN domain 224 using protocol stack 652, and the CU of the RAN domain 224 may communicate with the transport network 230 (e.g., SRv6 underlay 330) using protocol stack 653. For example, the CU of the RAN domain 224 may communicate with PE-1 (e.g., ingress PE 332). As shown in FIG. 6, the ingress PE-1 332 may add an SRv6 protocol layer (e.g., encapsulate incoming packets), which may comprise a slice identifier (SID), an SRv6 source address (SA), and a SRv6 destination address (DA), to protocol stack 654. The ingress PE-1 332 may communicate via transport network path 334 with PE-2 (e.g., egress PE 336), which may in turn communicate with at least one device of the core domain 244 (e.g., user plane function (UPF) device 642).

In some embodiments, the NSC 310 may utilize the BGP-LS interface 614 to obtain transport slice identifier information (e.g., TN Slice-ID 318) for the transport network 230. Alternatively or additionally, the NSC 310 may generate the transport slice mapping database 311, which comprises mappings between S-NSSAI values and TN Slice-ID 318 values, based on the TN Slice-ID 318 values obtained via the BGP-LS interface 614. In other optional or additional embodiments, the NSC 310 may generate a transport slice path mapping database 312 that comprises mapping relationship between the transport slice identifier information (e.g., TN Slice-ID 318) and transport network paths (e.g., transport network path 334) used in the transport network domain 234.

In some embodiments, the NSC 310 may obtain (e.g., via telemetry interface 615) traffic matrix information (e.g., traffic matrix information 540).

The NSC 310 may be configured to predict, or obtain a prediction, of bandwidth usage in the transport network 600 on a per-transport network slice level, based on the TN Slice-ID 318. For example, the NSC 310 may predict a bandwidth usage of the transport network path 334 that corresponds to TN Slice-ID 318. That is, the NSC 310 may predict an aggregate bandwidth usage of a plurality of RAN slices (e.g., RAN slices 340 of FIG. 3) and a plurality of CN slices (e.g., CN slices 350 of FIG. 3) that are mapped to a transport network path (e.g., transport network path 334). As such, the NSC 310 may modify and/or adjust the configuration of the transport network slice, as indicated by the predicted aggregate bandwidth usage, to ensure compliance with the network path constraints (e.g., low latency, high bandwidth, high reliability) of the transport network path 334.

As shown in FIG. 6, the NSC 310 may communicate, via a northbound interface (NBI) 316, with an AI/ML predictor 320. The AI/ML predictor 320 may comprise an AI/ML classification model configured to predict at least one required configuration of the transport network slice (e.g., maximum aggregate bandwidth). In some embodiments, the AI/ML predictor 320 may correspond to any type of known computer, server, or data processing device (e.g., device 100). For example, the AI/ML predictor 320 may comprise a processor, a PC, a PCB comprising a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device. Alternatively or additionally, the AI/ML predictor 320 may be hosted by the same device hosting the NSC 310 (not shown). That is, the NSC 310 may comprise the AI/ML predictor 320.

The AI/ML classification model of the AI/ML predictor 320 may be configured to predict at least one required configuration of the transport network slice (e.g., maximum aggregate bandwidth), based on prediction input information 620 related to a particular transport network slice provided to the AI/ML classification model. The prediction input information 620 may comprise the TN Slice-ID 318 corresponding to the particular transport network slice. In some embodiments, the NSC 310 may provide, to the AI/ML predictor 320, the TN Slice-ID 318 of the particular transport network slice.

Alternatively or additionally, the prediction input information 620 may comprise the transport slice mapping database 311 comprising mappings between S-NSSAI values and TN Slice-ID 318 values. The transport slice mapping database 311 may identify to the AI/ML classification model the mapping between the aggregated RAN and CN slices and the particular transport network slice. That is, the transport slice mapping database 311 may allow the AI/ML classification model to identify the plurality of plurality of RAN slices 340 and the plurality of CN slices 350 that are mapped to the transport network path 334. In some embodiments, the NSC 310 may publish, to the AI/ML predictor 320, the transport slice mapping database 311 indicating one or more mapping relationships between the TN Slice-ID 318 and respective identifiers of the plurality of RAN slices and the plurality of CN slices mapped to the transport network slice.

Alternatively or additionally, the prediction input information 620 may comprise the transport slice path mapping database 312, which may indicate the mapping relationship between the TN Slice-ID 318 and one or more transport network paths 334 associated with the TN Slice-ID 318. In some embodiments, the NSC 310 may publish, to the AI/ML predictor 320, the transport slice path mapping database 312 indicating one or more mapping relationships between TN Slice-ID 318 and corresponding transport network paths 334 of the transport network 300.

Alternatively or additionally, the prediction input information 620 may comprise telemetry information 624 indicating historical bandwidth usage information of the plurality of RAN slices 340 and the plurality of CN slices 350 mapped to the transport network path 334. That is, the telemetry information 624 may refer to bandwidth usage information that may have been automatically recorded and transmitted (via telemetry interface 615, for example) from the SRv6 underlay 330 to the NSC 310. In some embodiments, the NSC 310 may provide, to the AI/ML predictor 320, the historical bandwidth usage information of the plurality of RAN slices 340 and the plurality of CN slices 350 mapped to the transport network slice.

Alternatively or additionally, the prediction input information may comprise traffic matrix information 540 related to slicing flow bandwidth and latency used in the transport network 300. In some embodiments, the NSC 310 may provide, to the AI/ML predictor 320, the traffic matrix information 540 related to slicing flow bandwidth and latency used in the transport network 300. The traffic matrix information 540 may be used to determine the per flow bandwidth and latency at the network-to-network interfaces (NNI) of the devices in the transport network 600.

Figure 5:
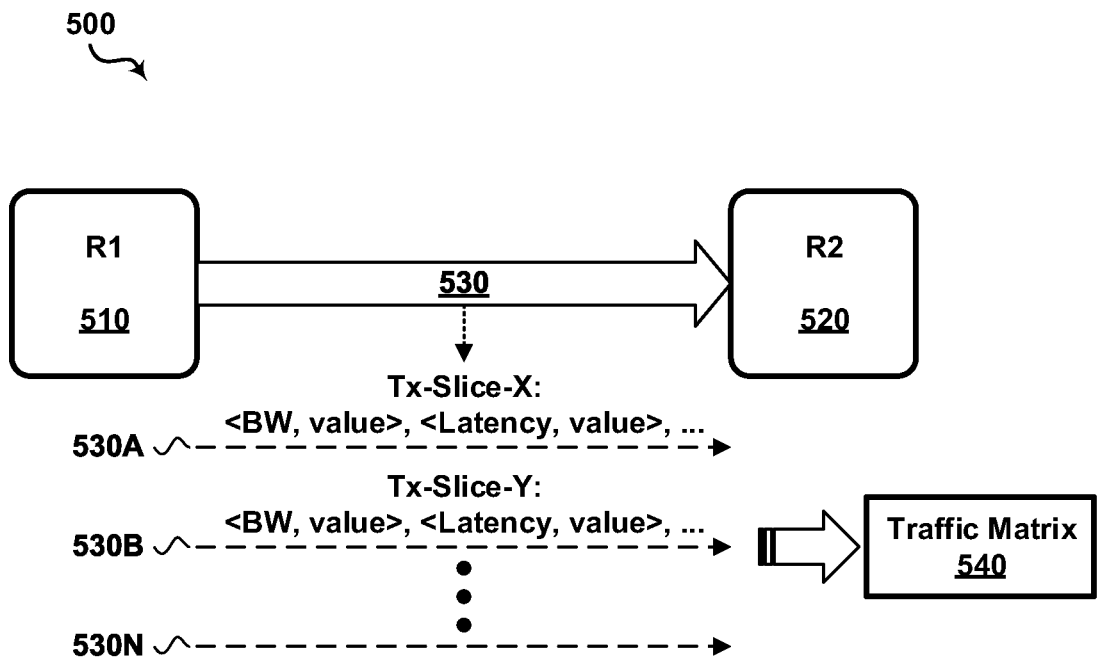
FIG. 5 illustrates an example for obtaining a traffic matrix in a transport network, in accordance with various embodiments of the present disclosure.

For example, as shown in FIG. 5, at a given interface level between transport network devices R1 510 and R2 520 (e.g., ingress PE 332 and egress PE 336 of FIGS. 3 and 6), a given network device (or node) may identify slicing flows (e.g., 530A, 530B, . . . , 530N) in addition to performance parameters for each slicing flow, such as, but not limited to, bandwidth usage and latency values. In some embodiments, the slicing flow information may be determined using netflow or SRv6 counters. The traffic matrix information 540 may comprise the slicing flow information identified by the transport network devices. Alternatively or additionally, the traffic matrix information 540 may comprise additional information based on the slicing flow information identified by the transport network devices.

Returning to FIG. 6, the AI/ML classification model may be configured to predict the at least one required configuration based on the transport slice identifier 318, the transport slice mapping database 311, the transport slice path mapping database 312, the historical bandwidth usage information 624, and the traffic matrix information 540 provided by the NSC 310.

In some embodiments, a supervised classification algorithm may use labels corresponding to each of the elements comprised by the prediction input information as class identifiers to train the AI/ML classification model. After completion of the training, the AI/ML classification model may be prepared to predict the aggregate bandwidth usage of transport network slices based at least on the prediction input information described above.

The AI/ML classification model may be configured to determine a bandwidth usage pattern for each TN Slice-ID 318 configured in the transport network 300, based at least on the existing network topology (e.g., transport network path 334) and the historical bandwidth usage information. Alternatively or additionally, the AI/ML classification model may use the historical bandwidth usage information and the mapping relationship between the TN Slice-ID 318 and one or more transport network paths 334 in predicting the aggregate bandwidth usage of transport network slices.

In some embodiments, the AI/ML classification model may be configured to determine whether one or more network path constraints (e.g., low latency, high bandwidth, high reliability) of the transport network path 334 may be met based on the prediction input information. For example, the AI/ML classification model may set a binary flag (e.g., yes/no, pass/fail) indicating whether the one or more network path constraints may be met based on a determination based on the historical data provided to the AI/ML classification model (e.g., prediction input information).

The AI/ML classification model may comprise one or more statistical models (e.g., logistic regression) that may be used to generate one or more estimates used the prediction of the aggregate bandwidth usage of the transport network slices. Alternatively or additionally, the AI/ML classification model may comprise one or more neural networks that may be used to generate the prediction of the aggregate bandwidth usage of the transport network slices. Examples of neural networks include, but are not limited to, multi-layer perceptrons (MLP), feed forward artificial neural network (FANN), convolutional neural networks (CNN), and recurrent neural networks.

In some embodiments, the AI/ML classification model may employ one or more recommendation techniques (e.g., collaborative filtering, data analytics, matrix factorization) to generate the prediction of the aggregate bandwidth usage of the transport network slices.

In some embodiments, the AI/ML classification model may be configured to predict the aggregate bandwidth usage of the transport network slices corresponding to a particular category and/or class of transport network slices. For example, the transport network slices of the transport network 300 may be classified according to the network path constraints that are to be met by the transport network path 334 (e.g., low latency, high bandwidth, high reliability). In such an example, the AI/ML classification model may be configured to predict the aggregate bandwidth usage of the transport network slices that belong to a particular category and/or class (e.g., low latency).

The NSC 310 may apply the at least one required configuration obtained from the AI/ML classification model to the transport network slice. For example, the NSC 310 may transmit a message to the one or more transport network nodes of the transport requesting the required change to the configuration of the transport network.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIGS. 1-3 and 5-6.

It may be understood that the specific order of the operations, the quantity of operations, and arrangement of operations described in reference to FIG. 6 are an illustration of one example approach. Based upon design preferences, it may be understood that the specific order, quantity, and/or arrangement of operations described in reference to FIG. 6 may be rearranged. Further, some operations may be added, combined, or omitted.

Advantageously, the aspects described herein may provide for transport slice prediction component 180 that may be configured to identify transport network slices in a data plane of a transport network such that aggregate bandwidth usage predictions may be obtained. The identification of transport network slices in the data plane of the transport network may also provide for implementation of one or more network slice-based policies on a per-slice basis, such as, isolation of traffic corresponding to one or more transport network slices, prioritization of transport network slice traffic based on QoS policies, traffic accounting and/or reporting on one or more transport network slices, and slice bandwidth prediction on one or more transport network slices, using a shared slicing aggregate (e.g., n:1) model.

Figure 7:
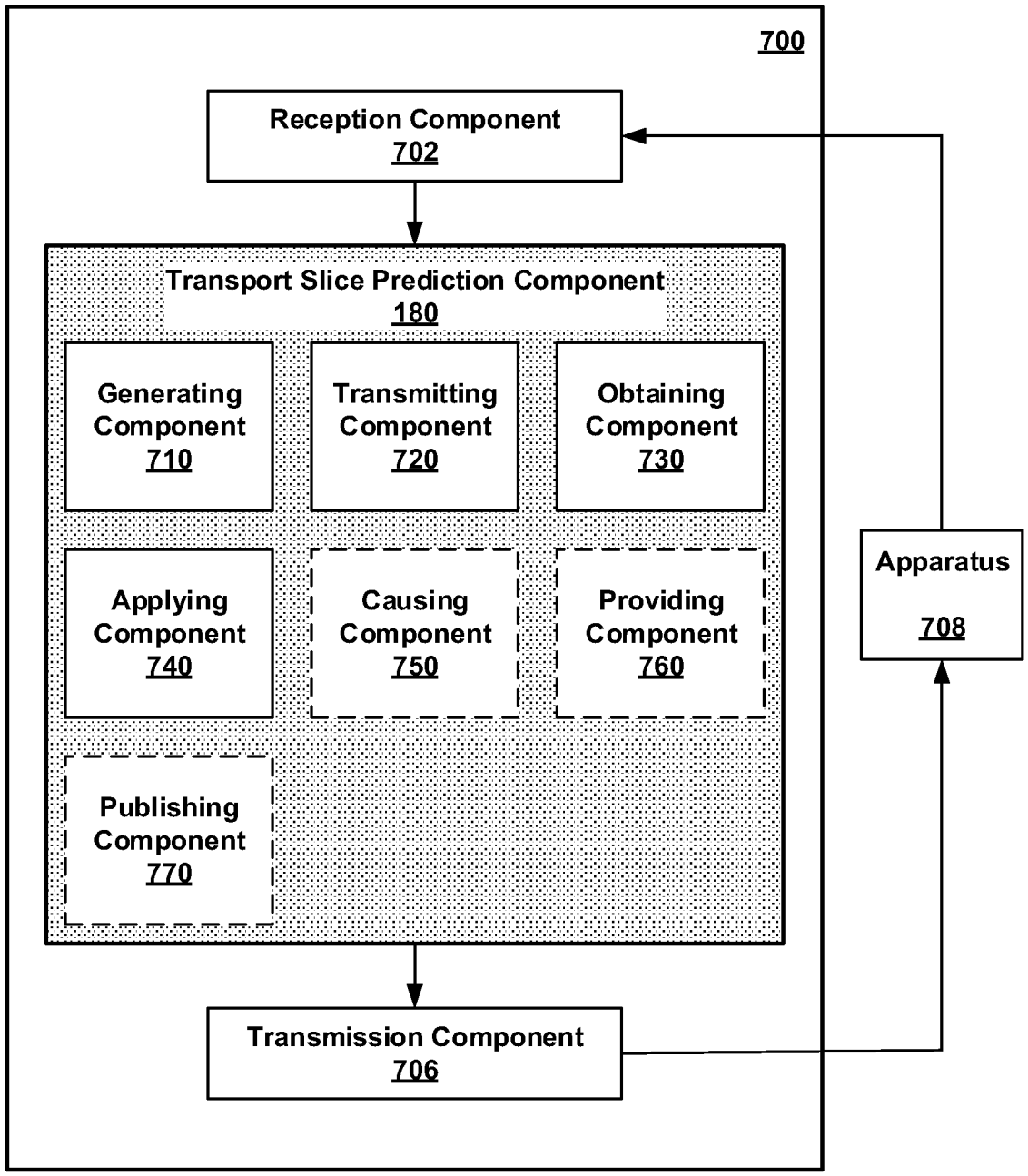
FIG. 7 is a block diagram of an example apparatus for identifying a transport network slice in a data plane of a transport network, in accordance with various embodiments of the present disclosure.

FIG. 7 is a block diagram of an example apparatus 700 for identifying a transport network slice in a data plane of a transport network. The apparatus 700 may be a computing device (e.g., device 100 of FIG. 1, NSC 310 of FIG. 3) or a computing device may include the apparatus 700. In some embodiments, the apparatus 700 may include a reception component 702 configured to receive communications (e.g., wired, wireless) from another apparatus (e.g., apparatus 708), a transport slice prediction component 180 configured to identify a transport network slice in a data plane of a transport network by a network device, and a transmission component 706 configured to transmit communications (e.g., wired, wireless) to another apparatus (e.g., apparatus 708). The components of the apparatus 700 may be in communication with one another (e.g., via one or more buses or electrical connections). As shown in FIG. 7, the apparatus 700 may be in communication with another apparatus 708 (such as the ingress PE 332, the egress PE 336, the AI/ML predictor 320, a database, a server, or another computing device) using the reception component 702 and/or the transmission component 706.

In some embodiments, the apparatus 700 may be configured to perform one or more operations described herein in connection with FIGS. 1-6. Alternatively or additionally, the apparatus 700 may be configured to perform one or more processes described herein, such as method 800 of FIG. 8. In some embodiments, the apparatus 700 may include one or more components of the device 100 described above in connection with FIGS. 1-6.

The reception component 702 may receive communications, such as control information, data communications, or a combination thereof, from the apparatus 708 (e.g., the ingress PE 332, the egress PE 336, the AI/ML predictor 320). The reception component 702 may provide received communications to one or more other components of the apparatus 700, such as the transport slice prediction component 180. In some aspects, the reception component 702 may perform signal processing on the received communications, and may provide the processed signals to the one or more other components. In some embodiments, the reception component 702 may include one or more antennas, a receive processor, a controller/processor, a memory, or a combination thereof, of the device 100 described above in reference to FIG. 1.

The transmission component 706 may transmit communications, such as control information, data communications, or a combination thereof, to the apparatus 708 (e.g., the ingress PE 332, the egress PE 336, the AI/ML predictor 320). In some embodiments, the transport slice prediction component 180 may generate communications and may transmit the generated communications to the transmission component 706 for transmission to the apparatus 708. In some embodiments, the transmission component 706 may perform signal processing on the generated communications, and may transmit the processed signals to the apparatus 708. In other embodiments, the transmission component 706 may include one or more antennas, a transmit processor, a controller/processor, a memory, or a combination thereof, of the device 100 described above in reference to FIG. 1. In some embodiments, the transmission component 706 may be co-located with the reception component 702 such as in a transceiver and/or a transceiver component.

The transport slice prediction component 180 may be configured to identify a transport network slice in a data plane of a transport network by a network device. In some embodiments, the transport slice prediction component 180 may include a set of components, such as a generating component 710 configured to generate a transport slice identifier, a transmitting component 720 configured to transmit a configuration message, an obtaining component 730 configured to obtain a prediction using an AI/ML model, and an applying component 740 configured to apply the at least one required configuration to the transport network slice.

Alternatively or additionally, the transport slice prediction component 180 may further include an causing component 750 configured to cause a transport network node to encapsulate an incoming packet, a providing component 760 configured to provide prediction input information to the AI/ML model, and a publishing component 770 configured to publish prediction input information to the AI/ML model.

In some embodiments, the set of components may be separate and distinct from the transport slice prediction component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 1.

Figure 8:
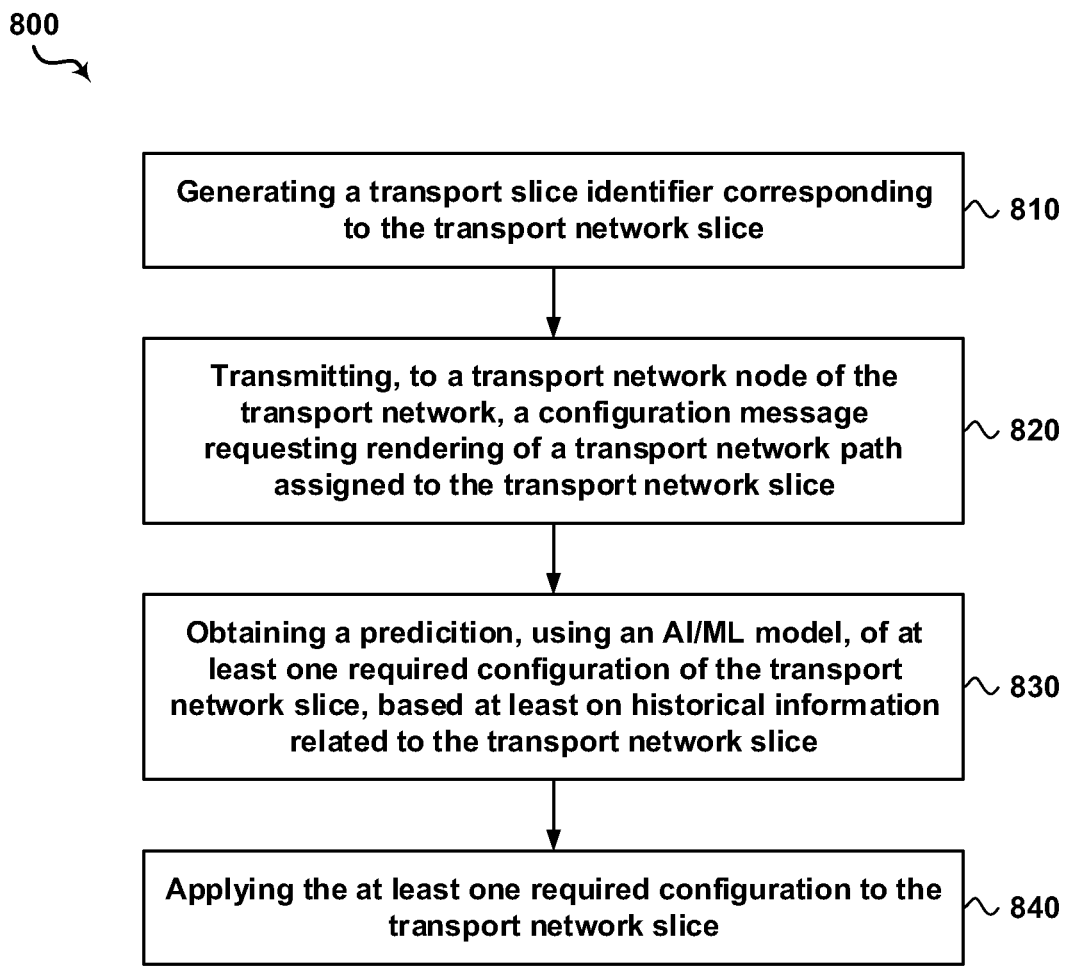
FIG. 8 is flowchart of an example method of identifying a transport network slice in a data plane of a transport network, in accordance with various embodiments of the present disclosure.

Referring to FIG. 8, in operation, an apparatus 700 may perform a method 800 of identifying a transport network slice in a data plane of a transport network by a network device. The method 800 may be performed by the device 100 (which may include the memory 130 and which may be the entire device 100 and/or one or more components of the device 100, such as the processor 120, the input component 150, the output component 160, the communication interface 170, and/or the transport slice prediction component 180). The method 800 may be performed by the transport slice prediction component 180 in communication with the apparatus 708 (e.g., the ingress PE 332, the egress PE 336, the AI/ML predictor 320).

At block 810 of FIG. 8, the method 800 may include generating a transport slice identifier corresponding to the transport network slice. For example, in an embodiment, the device 100, the transport slice prediction component 180, and/or the generating component 710 may be configured to or may comprise means for generating a transport slice identifier corresponding to the transport network slice.

For example, the generating at block 810 may include generating the transport slice identifier using a source address, a destination address, and network path constraints indicated by a slice creation request, as described in reference to FIG. 3.

In some embodiments, the transport network slice may be mapped to a plurality of RAN slices 340 and to a plurality of CN slices 350.

Further, for example, the generating at block 810 may be performed to generate the transport slide identifier used to identify the transport network slice in the data plane of the transport network 300.

At block 820 of FIG. 8, the method 800 may include transmitting, to a transport network node of the transport network, a configuration message requesting rendering of the transport network path assigned to the transport network slice. For example, in an embodiment, the device 100, the transport slice prediction component 180, and/or the transmitting component 720 may be configured to or may comprise means for transmitting, to a transport network node of the transport network, a configuration message requesting rendering of the transport network path assigned to the transport network slice.

For example, the transmitting at block 820 may include transmitting, to the transport network node of the transport network, the configuration message using a PCEP interface, as described in reference to FIG. 3.

Further, for example, the transmitting at block 820 may be performed to render the transport network path 334 such that the transport network slice corresponding to the network slice 260 may be implemented according to a slice creation request.

In other optional or additional embodiments, the method 800 may include causing an ingress node 332 of the one or more transport network nodes to encapsulate incoming packets corresponding to the transport network slice with an IPv6 header comprising the transport slice identifier TN Slice-ID 318. For example, in an embodiment, the device 100, the transport slice prediction component 180, and/or the causing component 750 may be configured to or may comprise means for causing an ingress node 332 of the one or more transport network nodes to encapsulate incoming packets corresponding to the transport network slice with an IPv6 header comprising the transport slice identifier TN Slice-ID 318.

In other optional or additional embodiments, the method 800 may include causing an egress node 336 of the one or more transport network nodes to de-encapsulate the IPv6 header comprising the transport slice identifier TN Slice-ID 318 from outgoing packets corresponding to the transport network slice. For example, in an embodiment, the device 100, the transport slice prediction component 180, and/or the causing component 750 may be configured to or may comprise means for causing an egress node 336 of the one or more transport network nodes to de-encapsulate the IPv6 header comprising the transport slice identifier TN Slice-ID 318 from outgoing packets corresponding to the transport network slice.

In other optional or additional embodiments, the method 800 may include causing the ingress node 332 to encapsulate the incoming packets with the IPv6 header comprising the transport slice identifier TN Slice-ID 318 in a source address field 410 of the IPv6 header. For example, in an embodiment, the device 100, the transport slice prediction component 180, and/or the causing component 750 may be configured to or may comprise means for causing the ingress node 332 to encapsulate the incoming packets with the IPv6 header comprising the transport slice identifier TN Slice-ID 318 in a source address field 410 of the IPv6 header.

In other optional or additional embodiments, the method 800 may include causing the ingress node 332 to encapsulate the incoming packets corresponding to the transport network slice with a SRH. For example, in an embodiment, the device 100, the transport slice prediction component 180, and/or the causing component 750 may be configured to or may comprise means for causing the ingress node 332 to encapsulate the incoming packets corresponding to the transport network slice with a SRH.

In other optional or additional embodiments, the method 800 may include causing the egress node 336 to de-encapsulate the SRH header from the outgoing packets corresponding to the transport network slice. For example, in an embodiment, the device 100, the transport slice prediction component 180, and/or the causing component 750 may be configured to or may comprise means for causing the egress node 336 to de-encapsulate the SRH header from the outgoing packets corresponding to the transport network slice.

In other optional or additional embodiments, the incoming packets corresponding to the transport network slice are addressed to traverse the transport network 300 to reach respective destinations outside of the transport network 300.

Further, for example, the encapsulation of incoming packets with an IPv6 header that identifies the incoming packets with the transport slice identifier TN Slice-ID 318 may be performed to allow for performing slice isolation, traffic prioritization, traffic accounting, and/or slice bandwidth prediction on the transport network slice, using a shared slicing aggregate (e.g., n:1) model.

At block 830 of FIG. 8, the method 800 may include obtaining a prediction, using an AI/ML model, of at least one required configuration of the transport network slice, based at least on historical information related to the transport network slice. For example, in an embodiment, the device 100, the transport slice prediction component 180, and/or the obtaining component 730 may be configured to or may comprise means for obtaining a prediction, using an AI/ML model, of at least one required configuration of the transport network slice, based at least on historical information related to the transport network slice.

For example, the obtaining at block 830 may include providing, to the AI/ML model, the transport slice identifier.

In some embodiments, the obtaining at block 830 may include publishing, to the AI/ML model, a transport slice mapping database indicating one or more first mapping relationships between the transport slice identifier and respective identifiers of the plurality of RAN slices and the plurality of CN slices mapped to the transport network slice.

In other optional or additional embodiments, the obtaining at block 830 may include publishing, to the AI/ML model, a transport slice path mapping database indicating one or more second mapping relationships between transport slice identifiers and transport network paths of the transport network.

In other optional or additional embodiments, the obtaining at block 830 may include providing, to the AI/ML model, historical bandwidth usage information of the plurality of RAN slices and the plurality of CN slices mapped to the transport network slice.

In other optional or additional embodiments, the obtaining at block 640 may include providing, to the AI/ML model, traffic matrix information 540 related to slicing flow bandwidth and latency used in the transport network 300.

In other optional or additional embodiments, the prediction of the at least one required configuration is based on the transport slice identifier 318, the transport slice mapping database 311, the transport slice path mapping database 312, the historical bandwidth usage information 624, and the traffic matrix information 540.

In other optional or additional embodiments, the at least one required configuration of the transport network slice is a maximum aggregated bandwidth of the transport network slice.

Further, for example, the obtaining at block 830 may be performed to obtain a predicted maximum aggregate bandwidth for the transport network slice that is needed to meet the network path constraints of the transport network path associated with the transport network slice.

At block 840 of FIG. 8, the method 800 may include applying the at least one required configuration to the transport network slice. For example, in an embodiment, the device 100, the transport slice prediction component 180, and/or the applying component 740 may be configured to or may comprise means for applying the at least one required configuration to the transport network slice.

For example, the applying at block 840 may include transmitting, to a transport network node, a configuration change request to modify the configuration of the transport network path 334.

Further, for example, the applying at block 840 may be performed to implement the configuration change obtained from the AI/ML predictor 320.

Advantageously, the aspects described herein may provide for transport slice prediction component 180 that may be configured to identify transport network slices in a data plane of a transport network such that aggregate bandwidth usage predictions may be obtained. The identification of transport network slices in the data plane of the transport network may also provide for implementation of one or more network slice-based policies on a per-slice basis, such as, isolation of traffic corresponding to one or more transport network slices, prioritization of transport network slice traffic based on QoS policies, traffic accounting and/or reporting on one or more transport network slices, and slice bandwidth prediction on one or more transport network slices, using a shared slicing aggregate (e.g., n:1) model.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of identifying a transport network slice in a data plane of a transport network by a network device, comprising:
   generating a transport slice identifier corresponding to the transport network slice;
   transmitting, to a transport network node of the transport network, a configuration message requesting rendering of a transport network path assigned to the transport network slice;
   obtaining a prediction, using an artificial intelligence/machine learning (AI/ML) model, of at least one required configuration of the transport network slice, based on historical information related to the transport network slice; and
   according to a constraint of the rendered transport network path, adjusting the transport network slice based on the at least one required configuration of the transport network slice.

2. The method of claim 1, wherein the method further comprises:
   causing an ingress node of one or more transport network nodes, including the transport network node of the transport network, to encapsulate incoming packets corresponding to the transport network slice with an Internet Protocol version 6 (IPv6) header comprising the transport slice identifier; and
   causing an egress node of the one or more transport network nodes to de-encapsulate the IPv6 header comprising the transport slice identifier from outgoing packets corresponding to the transport network slice.

3. The method of claim 2, wherein the causing of the ingress node comprises causing the ingress node to encapsulate the incoming packets with the IPv6 header comprising the transport slice identifier in a source address field of the IPv6 header.

4. The method of claim 2, wherein
   the causing of the ingress node comprises causing the ingress node to encapsulate the incoming packets corresponding to the transport network slice with a segment routing (SRH) header, and
   the causing of the egress node comprises causing the egress node to de-encapsulate the SRH header from the outgoing packets corresponding to the transport network slice.

5. The method of claim 2, wherein the incoming packets corresponding to the transport network slice are addressed to traverse the transport network to reach respective destinations outside of the transport network.

6. The method of claim 1, wherein the transmitting of the configuration message comprises transmitting, to the transport network node of the transport network, the configuration message using a path computation element communication protocol (PCEP).

7. The method of claim 1, wherein the transport network slice is mapped to a plurality of radio access network (RAN) slices and to a plurality of core network (CN) slices.

8. The method of claim 7, further comprising:
   providing, to the AI/ML model, the transport slice identifier;
   publishing, to the AI/ML model, a transport slice mapping database indicating one or more first mapping relationships between the transport slice identifier and respective identifiers of the plurality of RAN slices and the plurality of CN slices mapped to the transport network slice;
   publishing, to the AI/ML model, a transport slice path mapping database indicating one or more second mapping relationships between transport slice identifiers and transport network paths of the transport network;
   providing, to the AI/ML model, historical bandwidth usage information of the plurality of RAN slices and the plurality of CN slices mapped to the transport network slice; and
   providing, to the AI/ML model, traffic matrix information related to slicing flow bandwidth and latency used in the transport network,
   wherein the prediction of the at least one required configuration is based on the transport slice identifier, the transport slice mapping database, the transport slice path mapping database, the historical bandwidth usage information, and the traffic matrix information.

9. The method of claim 1, wherein the at least one required configuration of the transport network slice is a maximum aggregated bandwidth of the transport network slice.

10. An apparatus for identifying a transport network slice in a data plane of a transport network, comprising:
  a memory storage storing computer-executable instructions; and
  a processor communicatively coupled to the memory storage, wherein the processor is configured to execute the computer-executable instructions and cause the apparatus to:
    generate a transport slice identifier corresponding to the transport network slice;
    transmit, to a transport network node of the transport network, a configuration message requesting rendering of a transport network path assigned to the transport network slice;
    obtain a prediction, using an artificial intelligence/machine learning (AI/ML) model, of at least one required configuration of the transport network slice, based on historical information related to the transport network slice; and
    according to a constraint of the rendered transport network path, adjust the transport network slice based on the at least one required configuration of the transport network slice.

11. The apparatus of claim 10, wherein the computer-executable instructions further cause the apparatus to:
  cause an ingress node of one or more transport network nodes, including the transport network node of the transport network, to encapsulate incoming packets corresponding to the transport network slice with an Internet Protocol version 6 (IPv6) header comprising the transport slice identifier; and
  cause an egress node of the one or more transport network nodes to de-encapsulate the IPv6 header comprising the transport slice identifier from outgoing packets corresponding to the transport network slice.

12. The apparatus of claim 11, wherein the computer-executable instructions further cause the apparatus to cause the ingress node to encapsulate the incoming packets with the IPv6 header comprising the transport slice identifier in a source address field of the IPv6 header.

13. The apparatus of claim 11, wherein the computer-executable instructions further cause the apparatus to:
  cause the ingress node to encapsulate the incoming packets corresponding to the transport network slice with a segment routing (SRH) header; and
  cause the egress node to de-encapsulate the SRH header from the outgoing packets corresponding to the transport network slice.

14. The apparatus of claim 11, wherein the incoming packets corresponding to the transport network slice are addressed to traverse the transport network to reach respective destinations outside of the transport network.

15. The apparatus of claim 10, wherein the computer-executable instructions to transmit the configuration message further cause the apparatus to transmit, to the transport network node of the transport network, the configuration message using a path computation element communication protocol (PCEP).

16. The apparatus of claim 10, wherein the transport network slice is mapped to a plurality of radio access network (RAN) slices and to a plurality of core network (CN) slices.

17. The apparatus of claim 16, wherein the computer-executable instructions further cause the apparatus to:
  provide, to the AI/ML model, the transport slice identifier;
  publish, to the AI/ML model, a transport slice mapping database indicating one or more first mapping relationships between the transport slice identifier and respective identifiers of the plurality of RAN slices and the plurality of CN slices mapped to the transport network slice;
  publish, to the AI/ML model, a transport slice path mapping database indicating one or more second mapping relationships between transport slice identifiers and transport network paths of the transport network;
  provide, to the AI/ML model, historical bandwidth usage information of the plurality of RAN slices and the plurality of CN slices mapped to the transport network slice; and
  provide, to the AI/ML model, traffic matrix information related to slicing flow bandwidth and latency used in the transport network,
  wherein the prediction of the at least one required configuration is further based on the transport slice identifier, the transport slice mapping database, the transport slice path mapping database, the historical bandwidth usage information, and the traffic matrix information.

18. The apparatus of claim 10, wherein the at least one required configuration of the transport network slice is a maximum aggregated bandwidth of the transport network slice.

* * * * *